J. Albro.
Printing Oil Cloths.
No. 993. Reissued Jul. 3 1860
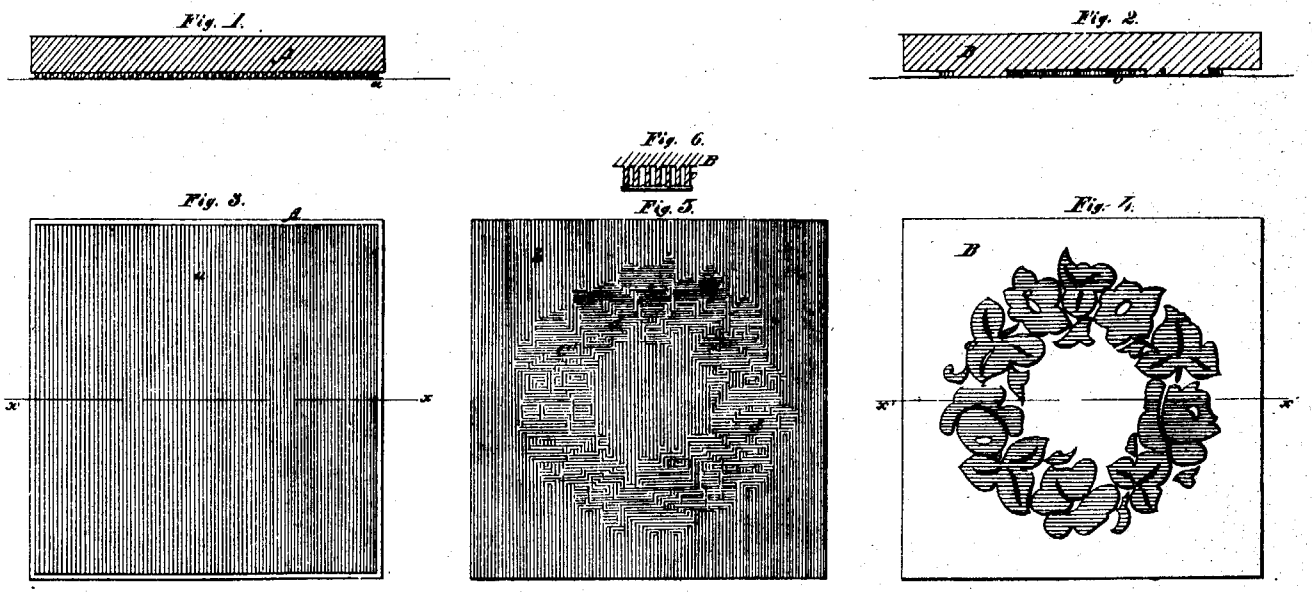
Witnesses,
W. Tusch
B. Wyth
Inventor,
James Albro

UNITED STATES PATENT OFFICE.

JAMES ALBRO, OF ELIZABETH, NEW JERSEY.

IMPROVEMENT IN PRINTING OIL-CLOTHS.

Specification forming part of Letters Patent No. 24,270, dated June 7, 1859; Reissue No. 993, dated July 3, 1860.

*To all whom it may concern:*

Be it known that I, JAMES ALBRO, of Elizabeth, in the county of Union and State of New Jersey, have invented a new and useful Improvement in Oil-Cloths; and I do hereby declare that the following is a full, clear, and exact description of the same, reference being had to the annexed drawings, making a part of this specification, in which—

Figures 1 and 2 are transverse sections of the blocks used to produce my improvement, taken respectively in the lines $x\ x\ x'\ x'$, Figs. 3 and 4; Figs. 3 and 4, face views of the same; Fig. 5, a face view of a piece of oil-cloth printed according to my invention; Fig. 6, an enlarged section of a block.

Similar letters of reference indicate corresponding parts in the several figures.

The object of this invention is to produce a new and improved article of manufacture in the way of oil-cloth by giving the same a damask figure—that is to say, a figure which, whether formed of one or more colors, will have a varying shaded appearance, due to the action or reflection of light.

The invention consists in forming the figure and ground of the face side of the oil-cloth of parallel ridges or raised surfaces, those forming the ground being at right angles to those forming the figure.

In producing this new and improved article of manufacture, if one color only be employed for both ground and figure, I form the ground after the color has been laid on, and when the same is green or soft, into parallel ridges by pressing a block, A, upon it by means of the usual press, the face side of said block being formed by means of raised surfaces or ridges *a*, which have spaces between them corresponding to the ridges to be made on the ground of the oil-cloth. The ridges formed on the green or soft ground of the cloth are represented by *b* in Fig. 5. On this ridged ground I form the figure C′ by means of a block, B, which has the figure formed on it by parallel ridges *c*, which run in a reverse direction to the ridges *b* of the ground. The block B is merely pressed on the ridged ground and the figure C′ is formed. In case a plurality of colors be used different-colored ground blocks are employed, the ground tint or color of the figure corresponding to the desired color to be given the figure.

It will be understood that a variety of colors diversifi s the figure, but they do not form it, the figure being formed by the lines of the ground running in a reverse direction to those of the figure. These raised lines or ridges of the ground and figure give the damask effect precisely the same as witnessed in the figures of textile fabrics, and also in embossed goods in which raised surfaces of the fabric are formed in parallel ridges. In these latter instances, however, the fabric itself is indented in order to form the figure, or the raised surfaces are formed by weaving, whereas in my invention the effect is produced by raising the ridges on a paint coating, which forms a covering for canvas.

My invention is altogether a different article from any ever produced with the figure or ornamentation described.

The woven fabrics, though beautiful, are expensive, and the embossed materials involve great expense in manufacture on account of the costly dies necessarily employed.

Oil-cloth manufactured as herein described will not cost any more than that manufactured in the ordinary way, and I therefore apply by my invention the beautiful damask figures to oil cloth, such as have hitherto only been produced by weaving or embossing in expensive fabrics.

I do not claim, broadly or irrespective of the material or article produced, the forming of figures and patterns by means of raised lines or ridges, those forming the ground being at right angles to those forming the figure; but I do claim as new, and desire to secure by Letters Patent, as a new article of manufacture—

An oil-cloth with an ornamental figured surface produced by means of raised lines or ridges, those forming the ground being at right angles to those forming the figure, substantially as described.

JAS. ALBRO.

Witnesses:
WM. TUZEH,
CHAS. HUGHES.